United States Patent
Sato et al.

(10) Patent No.: US 10,261,516 B2
(45) Date of Patent: Apr. 16, 2019

(54) VEHICLE CONTROL DEVICE

(71) Applicant: TOYOTA JIDOSHA KABUSHIKI KAISHA, Toyota-shi, Aichi-ken (JP)

(72) Inventors: Kunihito Sato, Mishima (JP); Kentaro Ichikawa, Shizuoka-ken (JP); Maiko Hirano, Nagoya (JP); Bunyo Okumura, Nisshin (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 0 days.

(21) Appl. No.: 15/870,160

(22) Filed: Jan. 12, 2018

(65) Prior Publication Data

US 2018/0210453 A1 Jul. 26, 2018

(30) Foreign Application Priority Data

Jan. 24, 2017 (JP) .................... 2017-010529

(51) Int. Cl.
*G01C 21/36* (2006.01)
*G05D 1/02* (2006.01)
*G01C 21/34* (2006.01)

(52) U.S. Cl.
CPC ........... *G05D 1/0274* (2013.01); *G01C 21/34* (2013.01); *G01C 21/36* (2013.01); *G05D 2201/0213* (2013.01)

(58) Field of Classification Search
CPC ......... G05D 1/0274; G05D 2201/0213; G01C 21/34; G01C 21/36; G01S 2013/9339;
(Continued)

(56) References Cited

U.S. PATENT DOCUMENTS 6,466,863 B2 * 10/2002 Shirai ............... B60K 31/0066
                                                       180/169
7,183,942 B2 * 2/2007 Rock ................. G01C 21/3697
                                                        340/901
(Continued)

FOREIGN PATENT DOCUMENTS

JP    2009-291540 A    12/2009
JP    2013-112067 A     6/2013

OTHER PUBLICATIONS

Salmond et al., Ground target modelling, tracking and prediction with road networks, 2007, IEEE, p. 1-8 (Year: 2007).*
(Continued)

*Primary Examiner* — Marc McDieunel
(74) *Attorney, Agent, or Firm* — Sughrue Mion, PLLC

(57) ABSTRACT

A vehicle control device includes a map database and at least one electronic control unit. The electronic control unit is configured to calculate a reference arrival position based on a target time or a target distance. The at least one electronic control unit is configured to determine, according to the map information or the external situation at the reference arrival position, as a target arrival position, a position where the vehicle arrives on the potential route in a time different from the target time or over a distance different from the target distance. The at least one electronic control unit is configured to calculate a transition route from the road position to the target arrival position, and generate the target route by connecting the transition route and the potential route following the target arrival position.

10 Claims, 9 Drawing Sheets

(58) Field of Classification Search
CPC .............. G01S 13/9353; B60T 2201/08; B60T 2201/02; B60T 2260/09
See application file for complete search history.

(56) References Cited

U.S. PATENT DOCUMENTS

| | | | | |
|---|---|---|---|---|
| 7,421,334 B2* | 9/2008 | Dahlgren | ............... | G07C 5/008 340/989 |
| 7,432,800 B2* | 10/2008 | Harter, Jr. | ............... | B60Q 9/008 340/435 |
| 7,589,643 B2* | 9/2009 | Dagci | ............... | B60K 31/185 340/441 |
| 8,090,489 B2* | 1/2012 | Delean | ............... | G08G 1/202 340/468 |
| 8,140,258 B1* | 3/2012 | Dempsey | ............. | G01C 21/206 340/870.02 |
| 8,346,437 B2* | 1/2013 | Hayakawa | ............ | B60W 30/12 701/42 |
| 8,401,732 B2* | 3/2013 | Taguchi | ............... | B60T 8/1755 701/122 |
| 8,412,416 B2* | 4/2013 | Schwindt | ............. | B62D 15/029 340/435 |
| 8,498,778 B2* | 7/2013 | Seymour | ................ | B60Q 1/346 211/175 |
| 8,630,795 B2* | 1/2014 | Breed | ................ | G01C 21/3697 123/352 |
| 9,020,536 B1* | 4/2015 | Crossno | ............. | G06Q 10/0833 455/456.1 |
| 2009/0326713 A1 | 12/2009 | Moriya | | |
| 2015/0197246 A1 | 7/2015 | Nagasaka et al. | | |

OTHER PUBLICATIONS

Sun et al., GVGrid: A QoS Routing Protocol for Vehicular Ad Hoc Networks, 2006, IEEE, p. 130-139 (Year: 2006).*
Necula, Mining GPS Data to Learn Driver's Route Patterns, 2015, IEEE, p. 264-271 (Year: 2015).*
Roth, Predicting route targets based on optimality considerations, 2014, IEEE, p. 1-8 (Year: 2014).*

* cited by examiner

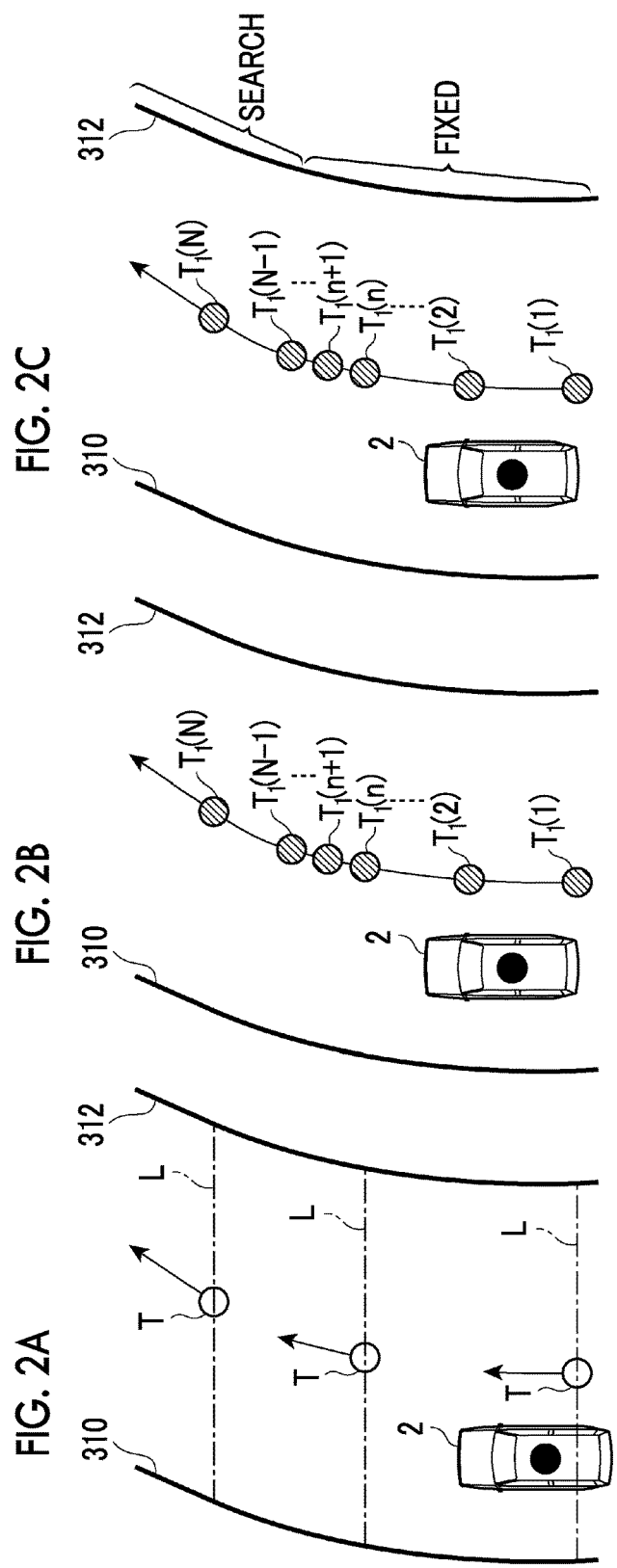

VEHICLE CONTROL DEVICE

INCORPORATION BY REFERENCE

The disclosure of Japanese Patent Application No. 2017-010529 filed on Jan. 24, 2017 including the specification, drawings and abstract is incorporated herein by reference in its entirety.

BACKGROUND

1. Technical Field

The present disclosure relates to a vehicle control device.

2. Description of Related Art

US 2015/0197246 A discloses a device for generating a route along which a vehicle will travel. This device calculates, in advance, a plurality of potential routes along which a vehicle can travel within a lane, based on the map information such as lane boundaries. After that, based on the sensor information and so on, the device selects, from the plurality of calculated potential routes, a potential route by which the vehicle can keep its distance from an obstacle. Then, the device generates a target route along which the vehicle can transit smoothly from the current route to the selected potential route for continued traveling.

SUMMARY

US 2015/0197246 A does not disclose a method for generating a route along which the vehicle will transit smoothly from the current route to a potential route. A route from the current route to a potential route can be generated using, for example, a predetermined target time (or target distance) from the current route to the potential route.

However, when the target time (or the target distance) is constant, there is a possibility that a route not following the shape of the road is generated or that a route with low reliability is generated. For example, when the road ahead of the vehicle is a curved road, using the target time (or the target distance) similar to that of a straight road for generating a route from the current route to a potential route may generate a route on which the steering operation will be started near the curve. Furthermore, as the road environment around the vehicle becomes more complicated (presence of a branch, increase or decrease in the number of lanes, merging from a side road, or a plurality of other vehicles around the vehicle), there are more events that must be predicted with the result that the reliability of the route calculation tends to be lowered.

According to the present disclosure, a route to arrive at a potential route, which is generated based on the map information, can be shortened according to the map information or the external situation ahead of the vehicle.

An aspect of the disclosure provides a vehicle control device. The vehicle control device according to the aspect includes: a map database that stores map information; and at least one electronic control unit. The at least one electronic control unit is configured to recognize a map position which is a position of a vehicle on a map, recognize an external situation of the vehicle and a road position which is a position of the vehicle on a road, recognize a traveling state of the vehicle, generate a target route based on the map information, the map position, the external situation, and the traveling state, cause the vehicle to travel based on the target route, determine a potential route based on the map information, calculate a reference arrival position based on a target time or a target distance, the road position, and the traveling state. The target time is a predetermined time required for the vehicle to arrive on the potential route. The target distance is a distance required for the vehicle to arrive on the potential route from the road position. The reference arrival position is a position where the vehicle arrives on the potential route from the road position using the target time or the target distance. The electronic control unit is configured to determine, according to the map information or the external situation at the reference arrival position, as a target arrival position, a position where the vehicle arrives on the potential route in a time different from the target time or over a distance different from the target distance, calculate a transition route from the road position to the target arrival position, and generate the target route by connecting the transition route and the potential route following the target arrival position.

In the aspect, the at least one electronic control unit may be configured to, according to the map information or the external situation at the reference arrival position, determine, as the target arrival position, a position where the vehicle arrives on the potential route in a time shorter than the target time or over a distance shorter than the target distance.

With the above configuration, when transiting to a potential route that has been generated based on the map information, this vehicle control device calculates the reference arrival position that is the position where vehicle will arrive on the potential route using the predetermined target time (or target distance). After that, the vehicle control device determines, as the target arrival position, a position where the vehicle will arrive on the potential route in a time shorter than the target time (or over a distance shorter than the target distance) according to the map information or the external situation at the reference arrival position. In this way, this device can set the target arrival position at a position that is nearer to the vehicle than the reference arrival position according to the map information or the external situation. Therefore, this device can generate a shorter transition route to the potential route, which has been generated based on the map information, according to the map information or the external situation ahead of the vehicle.

In the aspect, the at least one electronic control unit may be configured to generate the target route at a predetermined periodic interval. The transition route may include a first half from the road position to a predetermined point on a target route generated last time, and a second half from the predetermined point to the target arrival position. The at least one electronic control unit may be configured to calculate the second half.

With the above configuration, the at least one electronic control unit uses a part of the previous target route as the first half of the transition route, making it possible to reduce a decrease in the followability of the vehicle steering control.

In the aspect, the at least one electronic control unit may be configured to determine the reference arrival position as the target arrival position when a road curvature of the reference arrival position is equal to or smaller than a predetermined value, and may be configured to determine, as the target arrival position, the position where the vehicle arrives on the potential route in the time shorter than the target time or over the distance shorter than the target distance when the road curvature of the reference arrival position is larger than the predetermined value.

With the above configuration, on a road, such as a straight road, the road curvature of which is equal to or smaller than the predetermined value, this vehicle control device can cause the vehicle to arrive on the potential route at the reference arrival position; on the other hand, on a road, such as a curve, the road curvature of which is larger than the predetermined value, this vehicle control device can cause the vehicle to arrive on the potential route at a position that is nearer to the vehicle than the reference arrival position. In this way, this device can generate a shorter transition route to the potential route, which has been generated based on the map information, according to the map information (road shape).

In the aspect, the at least one electronic control unit may be configured to determine, as the target arrival position, a position on the potential route, at which road curvature is equal to or smaller than the predetermined value.

With the above configuration, this device can cause the vehicle to arrive on the potential route at a position near to the straight road.

In the aspect, the at least one electronic control unit may be configured to determine the reference arrival position as the target arrival position when the number of other vehicles around the reference arrival position is equal to or smaller than a predetermined number of vehicles, and may be configured to determine, as the target arrival position, the position where the vehicle arrives on the potential route in the time shorter than the target time or over the distance shorter than the target distance, when the number of other vehicles around the reference arrival position is larger than the predetermined number of vehicles.

With the above configuration, this vehicle control device can cause the vehicle to arrive on the potential route at the reference arrival position if the number of other vehicles is small and can cause the vehicle to arrive on the potential route at a position that is nearer to the vehicle than the reference arrival position if the number of other vehicles is large. In this way, this device can generate a shorter transition route to the potential route, which has been generated based on the map information, according to the external situation.

In the aspect, the at least one electronic control unit may be configured to determine the reference arrival position as the target arrival position when a road on which the vehicle is traveling is a freeway, and may be configured to determine, as the target arrival position, the position where the vehicle arrives on the potential route in the time shorter than the target time or over the distance shorter than the target distance, when the road on which the vehicle is traveling is an open road.

With the above configuration, this vehicle control device can cause the vehicle to arrive on the potential route at the reference arrival position if the road on which the vehicle is traveling is a freeway and can cause the vehicle to arrive on the potential route at a position that is nearer to the vehicle than the reference arrival position if the road on which the vehicle is traveling is an open road. In this way, this device can generate a shorter transition route to the potential route, which has been generated based on the map information, according to the map information (road type).

In the aspect, the at least one electronic control unit may be configured to generate a plurality of routes based on the map information, and may be configured to determine the potential route by selecting, according to the external situation, one route among the plurality of routes.

In the aspect, the map information may include a road curvature of a predetermined point on the potential route.

In the aspect, the vehicle control device may include an actuator. The at least one electronic control unit may be configured to cause the vehicle to travel autonomously using the actuator.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 2A is a diagram showing an example of the target route calculation processing by a travel plan generation unit;

FIG. 2B is a diagram showing an example of the target route calculation processing by a travel plan generation unit;

FIG. 2C is a diagram showing an example of the target route calculation processing by a travel plan generation unit;

DETAILED DESCRIPTION OF EMBODIMENTS

Figure 1:
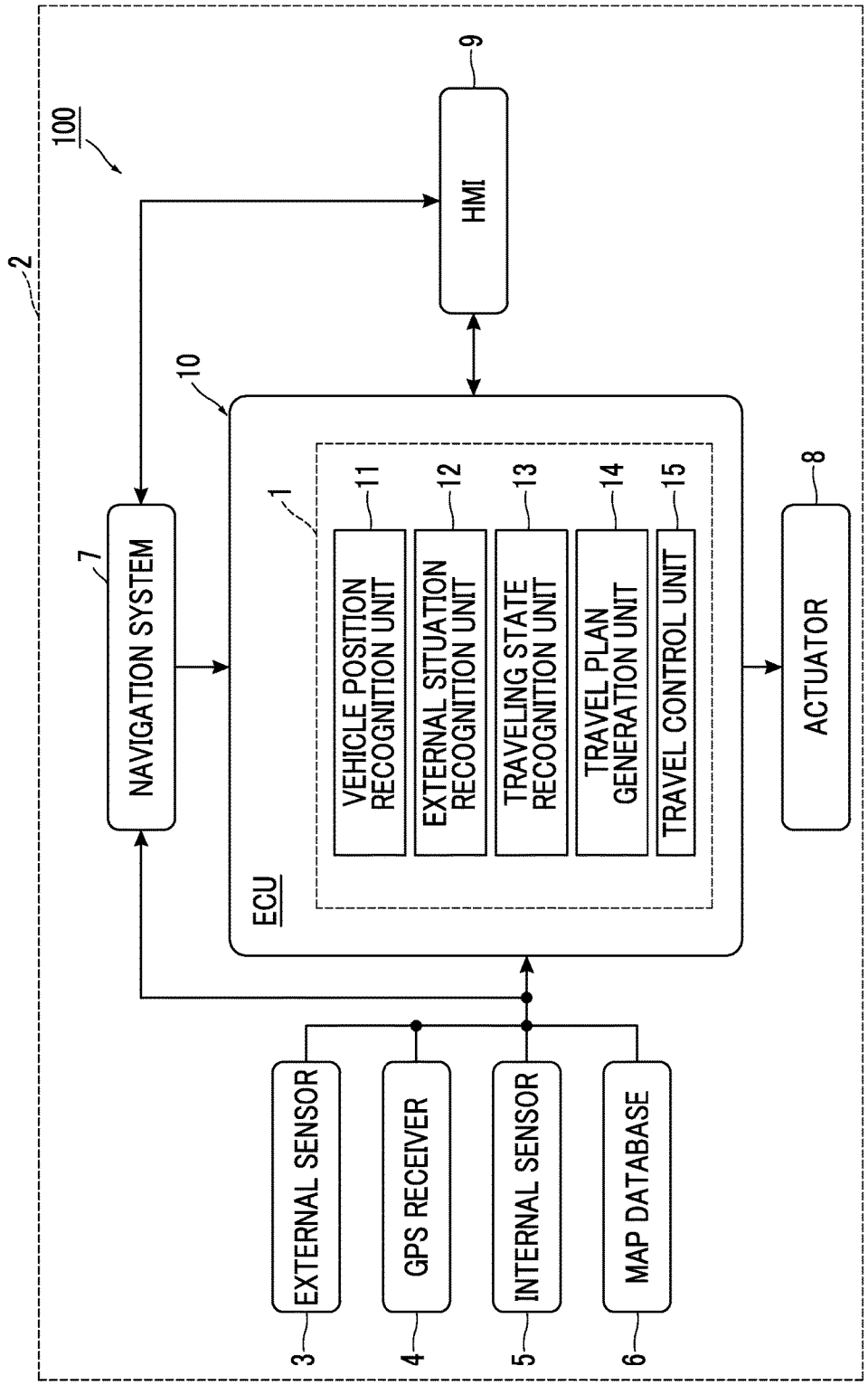
FIG. 1 is a block diagram showing a configuration of a vehicle including a vehicle control device according to a first embodiment.

Embodiments of the present disclosure will be described in detail below with reference to the drawings. In the description below, the same reference numeral is used for the same or equivalent component and the duplicated description is omitted.

First Embodiment

FIG. 1 is a block diagram showing a configuration of a vehicle 2 that includes a vehicle control device 1 according to a first embodiment. As shown in FIG. 1, a vehicle system 100 is mounted on the vehicle 2 such as a passenger car. The vehicle system 100 is a system that causes the vehicle 2 to travel in the autonomous driving mode. Autonomous driving is a vehicle control operation for autonomously driving the vehicle 2 toward a preset destination with no need for a driver to perform the driving operation. As will be described later, the vehicle system 100 includes the vehicle control device 1 that controls the traveling of the vehicle 2 based on a target route.

The vehicle system 100 includes an external sensor 3, a Global Positioning System (GPS) receiver 4, an internal sensor 5, a map database 6, a navigation system 7, an actuator 8, a Human Machine Interface (HMI) 9, and an Electronic Control Unit (ECU) 10.

The external sensor 3 is a detector that detects the situation (the external situation) around the vehicle 2. The external sensor 3 includes at least one of a camera and a radar sensor.

The camera is a capturing device that captures the external situation of the vehicle. The camera is provided on the interior side of the windshield of the vehicle. The camera sends the captured information on the external situation of the vehicle to the ECU 10. The camera may be a monocular camera or a stereo camera. The stereo camera has two capturing units arranged to reproduce the disparity between the left eye and the right eye. The information captured by the stereo camera also includes the information on the depth direction.

The radar sensor is a detector that detects obstacles around the vehicle 2 using radio waves (for example, millimeter waves) or light. The radar sensor includes, for example, a millimeter wave radar or a LIDAR (Laser Imaging Detection and Ranging). The radar sensor detects an obstacle by sending radio waves or light to the surroundings of the vehicle 2 and then receiving radio waves or light reflected by the obstacle. The radar sensor sends the detected obstacle information to the ECU 10. Obstacles include fixed obstacles such as guardrails and buildings, and moving obstacles such as pedestrians, bicycles, and other vehicles.

The GPS receiver 4 receives signals from three or more GPS satellites to acquire the position information indicating the position of the vehicle 2. The position information includes, for example, the information on the latitude and the longitude. The GPS receiver 4 outputs the measured position information on the vehicle 2 to the ECU 10. In place of the GPS receiver 4, other units that can identify the latitude and longitude of the vehicle 2 may also be used.

The internal sensor 5 is a detector that detects the travelling state of the vehicle 2. The internal sensor 5 includes at least a vehicle speed sensor. The vehicle speed sensor is a detector that detects the speed of the vehicle 2. An example of the vehicle speed sensor is a wheel speed sensor that is provided on the wheels of the vehicle 2, or on the drive shaft that rotates in synchronization with the wheels, to detect the rotation speed of the wheels. The vehicle speed sensor sends the detected vehicle speed information to the ECU 10. The internal sensor 5 may also include an acceleration sensor or a yaw rate sensor.

The acceleration sensor is a detector that detects the acceleration of the vehicle 2. The acceleration sensor includes a longitudinal acceleration sensor for detecting the acceleration in the longitudinal direction of the vehicle 2 and a lateral acceleration sensor for detecting the lateral acceleration of the vehicle 2. The acceleration sensor sends the acceleration information on the vehicle 2 to the ECU 10. The yaw rate sensor is a detector that detects the yaw rate (rotational angular velocity) around the vertical axis at the center of gravity of the vehicle 2. As the yaw rate sensor, a gyro sensor may be used. The yaw rate sensor sends the detected yaw rate information on the vehicle 2 to the ECU 10.

The map database 6 is a database that stores map information. The map database 6 is formed in a hard disk drive (HDD) mounted on the vehicle 2. The map information includes the road position information, lane information, road type information, road shape information, position information on intersections and branching points, and position information on buildings. The road type information is the information identifying the types of roads such as freeways or open roads. The road shape information is the type information (curved road or a straight road), the road curvature, and so on. The map database 6 may be stored in a computer of the facilities such as the information processing center that can communicate with the vehicle 2.

The navigation system 7 is a system for guiding the driver of the vehicle 2 to a destination that is set in advance. The navigation system 7 recognizes the traveling road and the traveling lane on which the vehicle 2 will travel, based on the position of the vehicle 2 measured by the GPS receiver 4 and the map information stored in the map database 6. The navigation system 7 calculates the target route from the position of the vehicle 2 to the destination, and uses the HMI 9 to guide the driver through the target route. The navigation system 7 sends the position information on the vehicle 2, the traveling lane information on the vehicle 2, and the target route of the vehicle 2 to the ECU 10.

The actuator 8 is a device that controls the traveling of the vehicle 2. The actuator 8 includes at least an engine actuator, a brake actuator, and a steering actuator. The engine actuator controls the driving force of the vehicle 2 by changing the amount of air to be supplied to the engine (for example, by changing the throttle angle) according to the control signal from the ECU 10. When the vehicle 2 is a hybrid vehicle or an electric vehicle, the engine actuator controls the driving force of the motor that works the power source.

The brake actuator controls the brake system according to the control signal from the ECU 10 to control the braking force to be applied to the wheels of the vehicle 2. For example, a hydraulic brake system can be used as the brake system. When the vehicle 2 is equipped with a regenerative brake system, the brake actuator may control both the hydraulic brake system and the regenerative brake system. The steering actuator controls the driving of the assist motor, which controls the steering torque in the electric power steering system, according to the control signal from the ECU 10. In this way, the steering actuator controls the steering torque of the vehicle 2.

The HMI 9 is an interface for outputting and inputting information between an occupant (including the driver) of the vehicle 2 and the vehicle system 100. The HMI 9 includes, for example, a display panel for displaying image information to an occupant, a speaker for outputting sound, and operation buttons or a touch panel for an occupant to perform an input operation. The HMI 9 sends the information, input by the occupant, to the ECU 10. Furthermore, the HMI 9 displays the image information, generated corresponding to the control signal from the ECU 10, on the display.

The ECU 10 controls the vehicle 2. The ECU 10 is an electronic control unit having a Central Processing Unit (CPU), a Read Only Memory (ROM), a Random Access Memory (RAM), and a Controller Area Network (CAN) communication circuit. The ECU 10 is connected to a network that communicates, for example, via a CAN communication circuit. The ECU 10 is connected to the components of the vehicle 2 described above so that it can communicate with them. For example, the ECU 10 operates the CAN communication circuit to input and output data based on the signal output from the CPU, stores the input data into the RAM, loads a program stored in the ROM into the RAM, and executes the loaded program. By doing so, the ECU 10 implements the function of its components which will be described below. The ECU 10 may be configured by a plurality of electronic control units.

The ECU 10 includes a vehicle position recognition unit 11, an external situation recognition unit 12, a traveling state recognition unit 13, a travel plan generation unit 14, and a travel control unit 15. The vehicle control device 1 includes the vehicle position recognition unit 11, external situation recognition unit 12, traveling state recognition unit 13, travel plan generation unit 14, and travel control unit 15.

The vehicle position recognition unit 11 recognizes the position of the vehicle 2 on the map (hereinafter referred to as "vehicle position") based on the position information on the vehicle 2 received by the GPS receiver 4 and the map information stored in the map database 6. The vehicle position recognition unit 11 may recognize the position of the vehicle 2 by acquiring the vehicle position, used in the navigation system 7, from the navigation system 7. When the vehicle position of the vehicle 2 can be measured with a sensor installed outside (e.g., on the road), the vehicle position recognition unit 11 may acquire the vehicle position from this sensor via communication.

The external situation recognition unit 12 recognizes the external situation of the vehicle 2 based on the detection result of the external sensor 3. The detection result includes the information captured by the camera and the object information sensed by the radar sensor. The external situation is the environment surrounding the vehicle 2. The external situation is, for example, the situation of objects around the vehicle 2. Objects include other vehicles and obstacles. The situation of an object may include the following: information for distinguishing between a fixed object and a moving object, the position of an object with respect to the vehicle 2, the moving direction of an object with respect to the vehicle 2, and the relative speed of an object with respect to the vehicle 2. For example, the external situation may include the road environment that is recognized. The road environment may include the position of the boundaries of the lane in which the vehicle 2 is traveling, the position of the lane center, the road width, and the road shape. The road shape may be represented by the information such as the curvature of the traveling lane or a slope change or an undulation in the road surface usable for estimating the visibility of the external sensor 3.

The traveling state recognition unit 13 recognizes the traveling state of the vehicle 2 based on the detection result of the internal sensor 5. The detection result of the internal sensor 5 includes, for example, the vehicle speed information sensed by the vehicle speed sensor. The detection result of the internal sensor 5 may include the acceleration information sensed by the acceleration sensor and the yaw rate information sensed by the yaw rate sensor. The traveling state is the state of the movement of the vehicle 2. The traveling state can be represented using the vehicle speed and so on.

The travel plan generation unit 14 generates a travel plan of the vehicle 2 based on the target route that is set by the navigation system 7 and the map information that is stored in the map database 6. The travel plan generation unit 14 starts the generation of a travel plan when the driver performs an operation to start the autonomous driving control. This travel plan is a long-term travel plan used by the vehicle 2 to travel from the current position of the vehicle 2 to the destination of the vehicle 2 that is set in advance.

A travel plan includes the control target values of the vehicle 2 according to the positions of the vehicle 2 on the target route. The positions on the target route are positions on the map in the extending direction of the target route. The positions on the target route mean set longitudinal positions that are set at predetermined intervals (for example, at one-meter intervals) in the extending direction of the target route. Each of the control target value is the value of a control target of the vehicle 2 used in the travel plan. The control target value is set in association with each set longitudinal position on the target route. The travel plan generation unit 14 generates a travel plan by setting the set longitudinal positions at predetermined intervals on the target route and, at the same time, setting the control target value for each set longitudinal position. The set longitudinal position and the target lateral position may be combined and set as one set of positional coordinates. The set longitudinal position and the target lateral position mean the longitudinal position information and the lateral position information that are set as a target in the travel plan.

In addition to the long-term travel plan that depends on the map information, the travel plan generation unit 14 generates a short-term travel plan corresponding to the actual road environment. A short-term travel plan is generated as a plan that is used for the duration when the vehicle 2 travels within the detection range of the external sensor 3 (for example, a range within 150 m ahead of the vehicle 2).

Like a travel plan, a short-term travel plan has short-term control target values each corresponding to a set longitudinal position on the target route. The short-term control target value is the control target value of the vehicle 2 in the short-term travel plan. The short-term control target value is set in association with each set longitudinal position on the target route. The short-term control target value includes the short-term target lateral position of the vehicle 2 and the short-term target vehicle speed of the vehicle 2. The short-term target lateral position is the lateral position of the vehicle 2 that is the control target in the short-term travel plan. The short-term target vehicle speed is the vehicle speed of the vehicle 2 that is the control target in the short-term travel plan.

The travel plan generation unit 14 generates a short-term travel plan based on the external situation of the vehicle 2 recognized by the external situation recognition unit 12, the traveling state of the vehicle 2 recognized by the traveling state recognition unit 13, the position of the vehicle 2 recognized by the vehicle position recognition unit 11, and the travel plan (the travel plan from the current position of the vehicle 2 to the destination generated based on the map information).

When the map information is correct, the travel plan generation unit 14 can use a control target value of the long-term travel plan as a short-term control target value of the short-term travel plan. For example, when the vehicle 2 is traveling in a lateral position deviated from the travel plan (a lateral position deviated from the center position of the lane), the travel plan generation unit 14 generates a short-term travel plan so that the vehicle 2 returns from the current position of the vehicle 2 to the center position of the lane. Generation of such a short-term travel plan can be realized by referring to Japanese Patent Application Publication No. 2009-291540 (JP 2009-291540 A). A scene in which the vehicle 2 travels at a lateral position deviated from the travel plan may occur when there is a control error due to the influence of a disturbance or when the target lateral position is changed depending on the external situation.

The travel control unit 15 outputs the control signal to the actuator 8 based on the travel plan generated by the travel plan generation unit 14. This control signal causes the vehicle 2 to travel autonomously according to the travel plan.

An example of the short-term travel plan generation processing by the travel plan generation unit 14 will be described below. As an example of generating a short-term travel plan, the travel plan generation unit 14 generates a target route at predetermined intervals. As a result, the target route for use in a certain range ahead of the vehicle 2 (for example, the detection range of the external sensor 3) is generated at a predetermined interval.

The predetermined interval is set to an interval shorter than the time that will elapse until the vehicle 2 reaches from the current position to the end of the previous target route. This means that, for an area that is in a certain range ahead of the vehicle 2 and is nearer to the vehicle 2, the previous target route can be used. When there is the previous target route, the travel plan generation unit 14 uses at least a part of the route, which is included in a certain range ahead of the vehicle 2 and which overlaps with the previous target route, as a part of the current target route. That is, as the area that is in a certain range ahead of the vehicle 2 and is near to the vehicle 2 (proximity area), the travel plan generation unit 14 uses the target route calculated last (fixed part). In this way, the target route in the area near to the vehicle 2, which affects the travel control, is maintained (fixed). This improves the followability of the travel control.

Also, in an area that is included in a certain range ahead of the vehicle 2 and is far from the vehicle 2, the reliability of the sensor may decrease and, in addition, the environment may change before the vehicle 2 reaches there. Therefore, for a certain range ahead of the vehicle 2, the travel plan generation unit 14 searches only a predetermined range beginning at the end of the fixed part and, beyond that part, connects the route to the route generated based on the map information (route used for the long-term travel plan). In this way, as the route in a distant area, the travel plan generation unit 14 uses the route generated based on the map information, thus improving the reliability of the target route while reducing the route calculation cost.

The detail of the fixed part of a target route will be described in detail below. FIGS. 2A to 2C are diagrams showing an example of the target route calculation processing by the travel plan generation unit 14. As shown in FIG. 2A, the travel plan generation unit 14 acquires the positions of the lane boundaries 310 and 312 of the lane, in which the vehicle 2 is traveling, via the external sensor 3. Then, the travel plan generation unit 14 divides the lane boundaries 310 and 312 into a plurality of pieces, each having a predetermined length, in the extending direction and, after that, finds a plurality of center points T of the line segments L each connecting the two opposing points on the lane boundaries 310 and 312. The plurality of center points T are connected to form a route. The center points of these line segments L are target passing points, and the target passing points calculated as described above are calculated target passing points. The travel plan generation unit 14 may generate a plurality of routes and select one route from the plurality of routes according to the external situation.

Next, the travel plan generation unit 14 determines whether the previous target route, which was previously generated, is stored in the storage unit of the ECU 10. If it is determined that the previous travel route is not stored, the travel plan generation unit 14 generates the target route without using the previous travel route. As shown in FIG. 2B, the travel plan generation unit 14 generates a plurality of target passing points $T_1(1), T_1(2), \ldots, T_1(N)$ at a pre-set granularity for the route shown in FIG. 2A and then interpolates the route by connecting these target passing points to generate the target route. After the target route is generated, the travel plan generation unit 14 calculates the short-term control target values (the short-term target lateral position of the vehicle 2 and the short-term target vehicle speed of the vehicle 2). In addition, to each target passing point, the travel plan generation unit 14 gives a target time that is a time used as a target at which the vehicle 2 will pass the target passing point. The target time is calculated based on the target route and the vehicle speed.

After a target time is given to each target passing point, the travel plan generation unit 14 determines the fixed target passing points that are included in the fixed part. The travel plan generation unit 14 sets the target passing points within a predetermined area near to the vehicle 2 as the fixed target passing points. The travel plan generation unit 14 sets the target passing points other than the fixed target passing points as search target passing points. Whether a target passing point is a fixed target passing point or a search passing point is determined in such a way that, when the target time of the target passing point is earlier than the fixed time obtained by adding the prefetching time to the current time, the target passing point is a fixed target passing point. For example, as shown in FIG. 2C, the stored target passing points $T_1(1), T_1(2), \ldots, T_1(n)$, included in the area near to the vehicle 2, are fixed target passing points, and $T_1(n+1)$, $T_1(n+2), \ldots, T_1(N)$ are search target passing points.

After setting the fixed target passing points and the search target passing points, the travel plan generating unit 14 determines whether the generated target route is smooth and is not deviated from the lane. If it is determined that the target route is smooth and is not deviated from the lane, the travel plan generation unit 14 stores the target route in the storage unit of the ECU 10. The stored target route is used when the next target route is generated. On the other hand, if it is determined that the target route is not smooth or is deviated from the lane, the travel plan generation unit 14 generates a traveling course for stopping the vehicle.

If the previous target route is stored in the storage unit of the ECU 10, the travel plan generation unit 14 deletes a stored target passing point of the previous target route if the target time of the stored target passing point is a past time. Next, the travel plan generation unit 14 extracts the search target passing points from the stored target passing points of the previous target route. After that, with the search target passing points of the previous target route as the fixed target passing points, the travel plan generation unit 14 performs the search processing for generating a route that extends from the end of the fixed target passing points.

Next, connection to a route generated based on the map information will be described below. In the description below, a route generated based on the map information is called a potential route. In general, when the vehicle 2 travels on a straight road with no obstacle or disturbance around the vehicle 2, the route generated based on the search result and the potential route match. However, when there is an obstacle, the target lateral position may be changed in the route generated based on the search result. In some other case, a control error in the lateral position may occur due to a disturbance. In addition, in some case, there is a plurality of potential routes in one lane and a potential route that can keep the largest distance from the obstacle is selected. In these cases, a route generated by connecting the end of the fixed target passing points and the potential route is required. In the description below, the route for causing the vehicle 2 to move to a potential route is called a transition route.

Figure 3A:
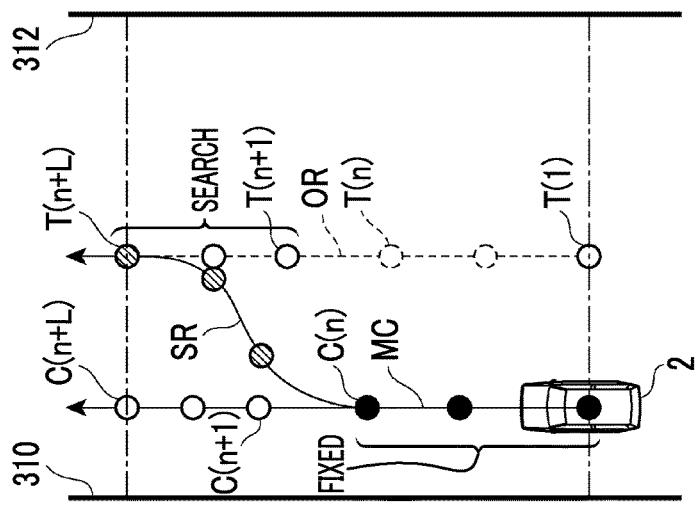
FIG. 3A is a diagram showing a transition route.
Figure 3B:
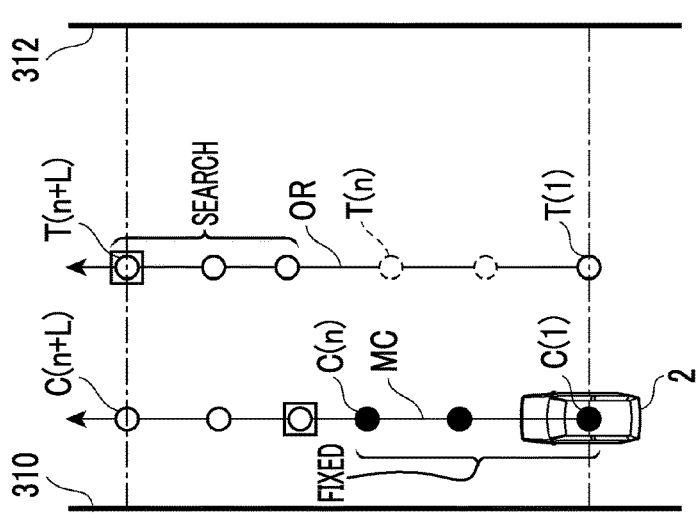
FIG. 3B is a diagram showing a transition route.
Figure 3C:
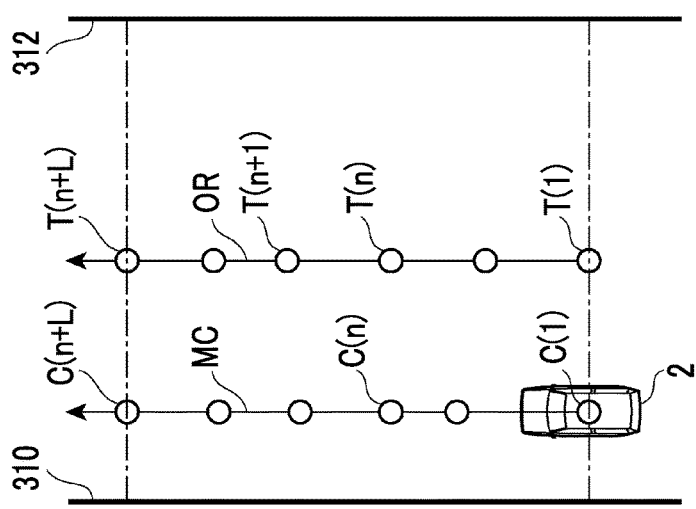
FIG. 3C is a diagram showing a transition route.

FIGS. 3A to 3C are diagrams showing a transition route. As shown in FIG. 3A, it is assumed that the vehicle 2 is traveling along the previous target route MC. It is also assumed that, in a lateral position different from that of the previous target route MC, there is a potential route OR that is used for the current target route. In this case, as shown in FIG. 3B, the travel plan generation unit 14 sets the target passing points that are included in the previous target route MC and are near to the vehicle 2 as the fixed target passing points, and the other target passing points as search target passing points. In addition, the travel plan generation unit 14 sets the target passing points that are included in the potential route OR and whose target times are nearest to those of the fixed target passing points as non-search target passing points and, at the same time, sets the target passing points whose target times are nearest to those of the search target passing points in the previous target route MC as the search target passing points.

After that, the travel plan generation unit 14 generates the transition route SR using the fixed target passing points in the previous target route MC and the search target passing points in the potential route OR. For example, as shown in FIG. 3C, the travel plan generation unit 14 generates a route that approaches the search target passing points in the potential route OR under the condition that the route passes through the fixed target passing points in the previous target route MC. The route from the vehicle position C(1) to the search target passing point T(n+L), which is the position where the vehicle 2 will arrive on the potential route OR, is set as the transition route SR. In the description below, T(n+L), which is the end point of the search target passing points, is also called an arrival position. That is, the transition route SR includes the first half (fixed part), from the vehicle position C(1) to the predetermined point C(n) on the target route generated last time, and the second half from the predetermined position C(n) to the search target passing point T(n+L) that is the arrival position. In this way, the travel plan generation unit 14 generates a short-term travel plan using the transition route SR and the potential route OR.

Figure 4:
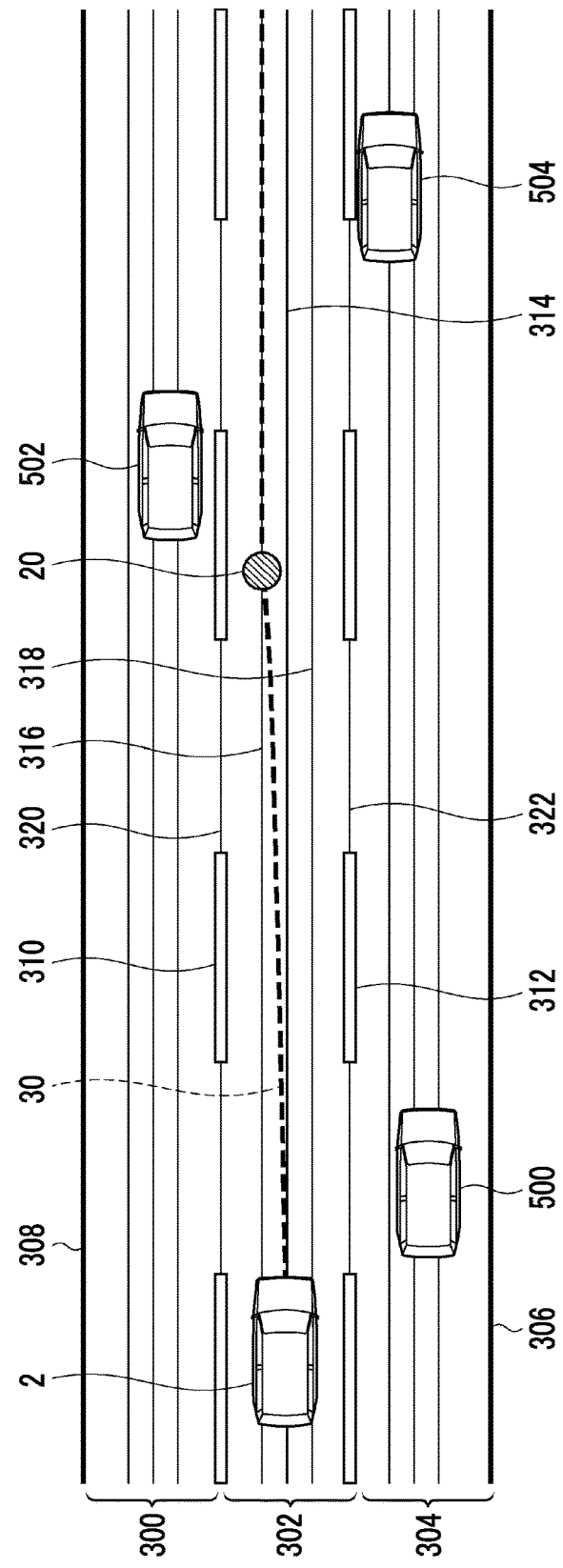
FIG. 4 is a diagram showing an example of an arrival position.

FIG. 4 is a diagram showing an example of an arrival position. As shown in FIG. 4, the vehicle 2 is traveling in the lane 302 that is one of the three lanes 300, 302, and 304. The lane 300 is delimited by lane boundaries 308 and 310, the lane 302 is delimited by lane boundaries 310 and 312, and the lane 304 is delimited by lane boundaries 312 and 306. The travel plan generation unit 14 generates, within the lane 302 in which the vehicle 2 travels, five potential routes 314, 316, 318, 320, and 322 along the lane 302, based on the positions of the lane boundaries 310 and 312. The travel plan generation unit 14 determines one potential route from the five potential routes 314, 316, 318, 320, and 322 according to the external situation. For example, the travel plan generation unit 14 selects the potential route 316 according to the positions of the other vehicles 502 and 504. By combining the transition route, from the vehicle position of the vehicle 2 to the potential route 316, and the potential route 316 that follows, the target route 30 of the vehicle 2 is generated. The position 20, where the vehicle 2 arrives on the potential route 316 from the vehicle position on the potential route 314, is the arrival position.

Figure 5:
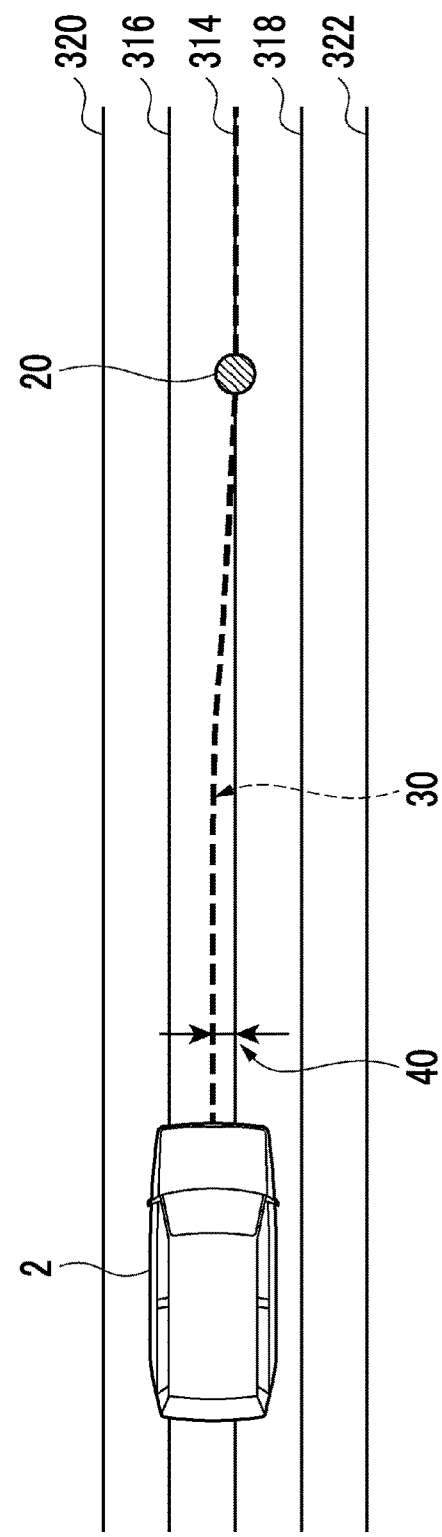
FIG. 5 is a diagram showing another example of an arrival position.

FIG. 5 is a diagram showing another example of an arrival position. In the example shown in FIG. 5, the travel plan generation unit 14 selects the potential route 314 as the target route. The vehicle 2 is controlled so that it travels along the potential route 314. In this example, the lateral position of the vehicle 2 is offset from the potential route 314 due to a control error such as a disturbance (40 in FIGS. 5 and 6). In this case, the target route 30 of the vehicle 2 is generated by combining the transition route, from the vehicle position of the vehicle 2 to the potential route, and the potential route 314 that follows. The position 20, where the vehicle 2 arrives on the potential route 314 from the vehicle position, is the arrival position. In this way, an arrival position is generated not only when the target potential route is changed but also when the vehicle 2 cannot follow the target potential route (when a control error is generated). That is, an arrival position is generated when there is a lateral offset between the target potential route and the vehicle position.

The arrival position described above can be obtained using a predetermined target time or target distance required for the vehicle 2 to arrive on the potential route from the vehicle position. The target time or the target distance is a fixed value since it is a predetermined value. However, when the target time (or the target distance) is fixed, there is a possibility that a route not following the shape of the road will be generated. For example, when the road ahead of the vehicle 2 is a curve, using the same target time (or target distance) as that for a straight road may generate a route where steering must be started near the curve.

Figure 6:
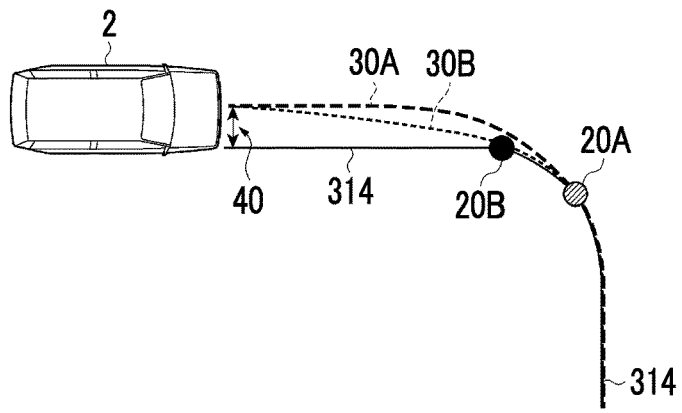
FIG. 6 is a diagram showing an arrival position in a curve.

FIG. 6 is a diagram showing an arrival position in a curve. As shown in FIG. 6, the potential route 314 curves ahead of the vehicle 2. In this case, when an arrival position is set using the same target time (or target distance) as that for a straight road, the arrival position is set, for example, at the position 20A. The target route 30A, generated in this way, is a route in which steering must be started near the curve; that is, the generated target route 30A has not a shape along the curve. In this case, if the arrival position can be changed from the position 20A to the position 20B nearer to the vehicle 2, the target route 30B along the curve can be generated.

In order to generate a target route along a curve, the travel plan generation unit 14 sets the arrival time based on the map information so that the vehicle arrives at the arrival position from the vehicle position in a time shorter than the target time that is set on the assumption that the road is a straight road. Alternatively, the travel plan generation unit 14 sets the arrival time based on the map information so that the vehicle arrives at the arrival position from the vehicle position over a distance shorter than the target distance that is set on the assumption that the road is a straight road. In other words, the travel plan generation unit 14 makes the arrival position variable based on the map information. More specifically, the travel plan generation unit 14 sets the arrival position nearer to the vehicle 2 when the road is a curved road than when the road is a straight road, based on the road shape (road curvature).

Figure 7:
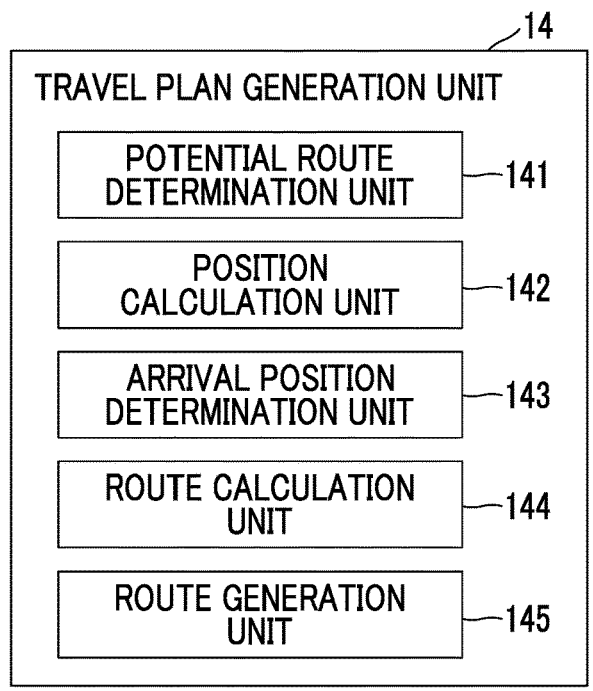
FIG. 7 is a block diagram showing a configuration of a travel plan generation unit.

The function of the above-described travel plan generation unit 14 will be described below. FIG. 7 is a block diagram showing a configuration of the travel plan generation unit 14. The travel plan generation unit 14 includes a potential route determination unit 141, a position calculation unit 142, an arrival position determination unit 143, a route calculation unit 144, and a route generation unit 145.

The potential route determination unit 141 determines a potential route, in which the vehicle 2 will travel, based on the map information. For example, the potential route determination unit 141 identifies the lane boundaries in the traveling route based on the map database 6, and generates a plurality of potential routes in the lane using the lane boundaries. Then, the potential route determination unit 141 determines one potential route from the plurality of potential routes according to an external situation and so on. The potential route determination unit 141 may generate only one potential route using the lane boundaries. In this case, the potential route determination unit 141 determines the generated one route as the potential route.

The position calculation unit 142 calculates the reference arrival position. The reference arrival position is the position where the vehicle 2 arrives on the potential route from the vehicle position in the target time or over the target distance, based on the target time or target distance, the vehicle position, and the traveling state. The target time or the target distance is a time or a distance required for the vehicle 2 to arrive on the potential route from the vehicle position. For example, the target time or the target distance is a time or a distance required for the vehicle 2 to be able to move smoothly to a potential route on a straight road. The target time or the target distance is set in advance. The traveling state is, for example, the vehicle speed. The reference arrival position is a position that is used as the reference when the arrival position is changed to a position nearer to the vehicle 2, as will be described later. The reference arrival position is a position where the vehicle 2 arrives on the potential route in the target time or over the target distance when the road is a straight road. The reference arrival position, which is the end of the transition route, is indicated by the above-described arrival position T(n+L) (see FIGS. 3A to 3C). In the example shown in FIG. 5, the vehicle 2 is offset from the potential route 314. The reference arrival position is the position 20 where the vehicle 2 arrives at the potential route 314 from the current vehicle position on the potential route 314. The reference arrival position is calculated at a predetermined periodic interval while the vehicle 2 is traveling. Therefore, the reference arrival position may be calculated also when the vehicle 2 is offset from the target route due to a control error such as a disturbance (see FIG. 5).

The arrival position determination unit 143 determines, as the target arrival position, a position where the vehicle 2 will arrive on the potential route in a time shorter than the target time or over a distance shorter than the target distance, in accordance with the map information corresponding to the reference arrival position. In this case, the map information, stored in the map database 6, represents the road shape, for example, the road curvature. The arrival position determination unit 143 sets the reaching time shorter than the target time. By doing so, the target arrival position (position 20B) can be set at a position that is nearer to the vehicle 2 than the reference arrival position (position 20A) (See FIG. 6). Alternatively, the arrival position determination unit 143 sets the reaching distance shorter than the target distance. By doing so, the target arrival position (position 20B) can be set at a position nearer to the vehicle 2 than the reference arrival position (position 20A) (See FIG. 6).

When the road curvature of the reference arrival position is equal to or smaller than the predetermined value, the arrival position determination unit 143 determines the reference arrival position as the target arrival position. On the other hand, when the road curvature of the reference arrival position is larger than the predetermined value, the arrival position determination unit 143 determines, as the target arrival position, a position at which the vehicle will arrive on the potential route in a time shorter than the target time or over a distance shorter than the target distance. In this way, the arrival position determination unit 143 uses the road curvature of the reference arrival position as the map information by referring to the map database 6. The predetermined value is set in advance for use in determining the road curvature. As the predetermined value, a value that distinguishes whether the road is a straight road or a curved road can be set. That is, the arrival position determination unit 143 determines the reference arrival position (position 20A) as the target arrival position when the road is a straight road, and determines the position (position 20B) nearer to the vehicle 2 than the reference arrival position (position 20A) as the target arrival position (see FIG. 6) when the road is a curved road.

The arrival position determination unit 143 determines, as the target arrival position, a position on the potential route where the road curvature becomes equal to or smaller than the predetermined value. The arrival position determination unit 143 searches the range, nearer to the vehicle 2 than the reference arrival position, for a position on the potential route where the road curvature becomes equal to or smaller than the predetermined value. The predetermined value is set in advance for use in determining the road curvature. The value for determining that the road is a straight road may be set as the predetermined value. This predetermined value may be a value different from, or same as, the predetermined value of the road curvature used for changing the target time.

Figure 8:
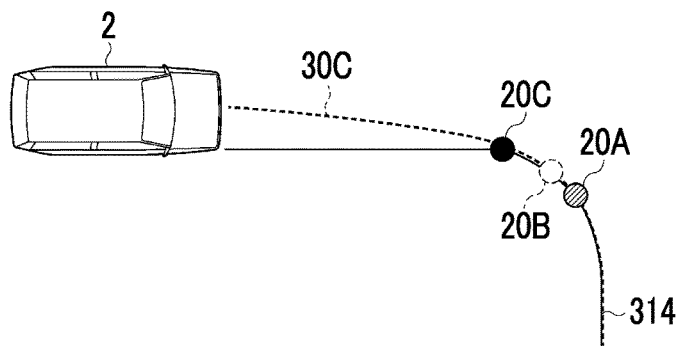
FIG. 8 is a diagram showing the target arrival position search processing according to a road shape.

FIG. 8 is a diagram showing the search processing of a target arrival position according to a road shape. As shown in FIG. 8, the arrival position determination unit 143 searches for a position on the potential route 314, nearer to the vehicle 2, toward the vehicle 2 side beginning at the position 20A that is the reference arrival position. For example, when the road curvature of the position 20B is not equal to or smaller than the predetermined value, the arrival position determination unit 143 calculates the arrival position by shortening the target time only for a small section and repeats the calculation until the road curvature at the arrival position becomes equal to or smaller than the predetermined value. When the road curvature at the position 20C is determined equal to or smaller than the predetermined value, the arrival position determination unit 143 sets the position 20C as the target arrival position.

The route calculation unit 144 calculates the transition route from the vehicle position to the target arrival position. As described above, the first half of the transition route may be fixed using the previous target route. In this case, the route calculation unit 144 calculates the second half of the transition route. The route calculation unit 144 generates the transition route by a known method using the target time and the vehicle speed. In the example shown in FIG. 8, the route from the position of the vehicle 2 to the position 20C, which is the target arrival position, is the transition route.

The route generation unit 145 generates the target route by connecting the transition route and the potential route that follows the arrival position. In the example shown in FIG. 8, the route generation unit 145 connects the route, from the position of the vehicle 2 to the position 20C that is the target arrival position, and the route that follows the position 20C of the potential route 314. As a result, the route generation unit 145 generates the target route 30C.

Figure 9:
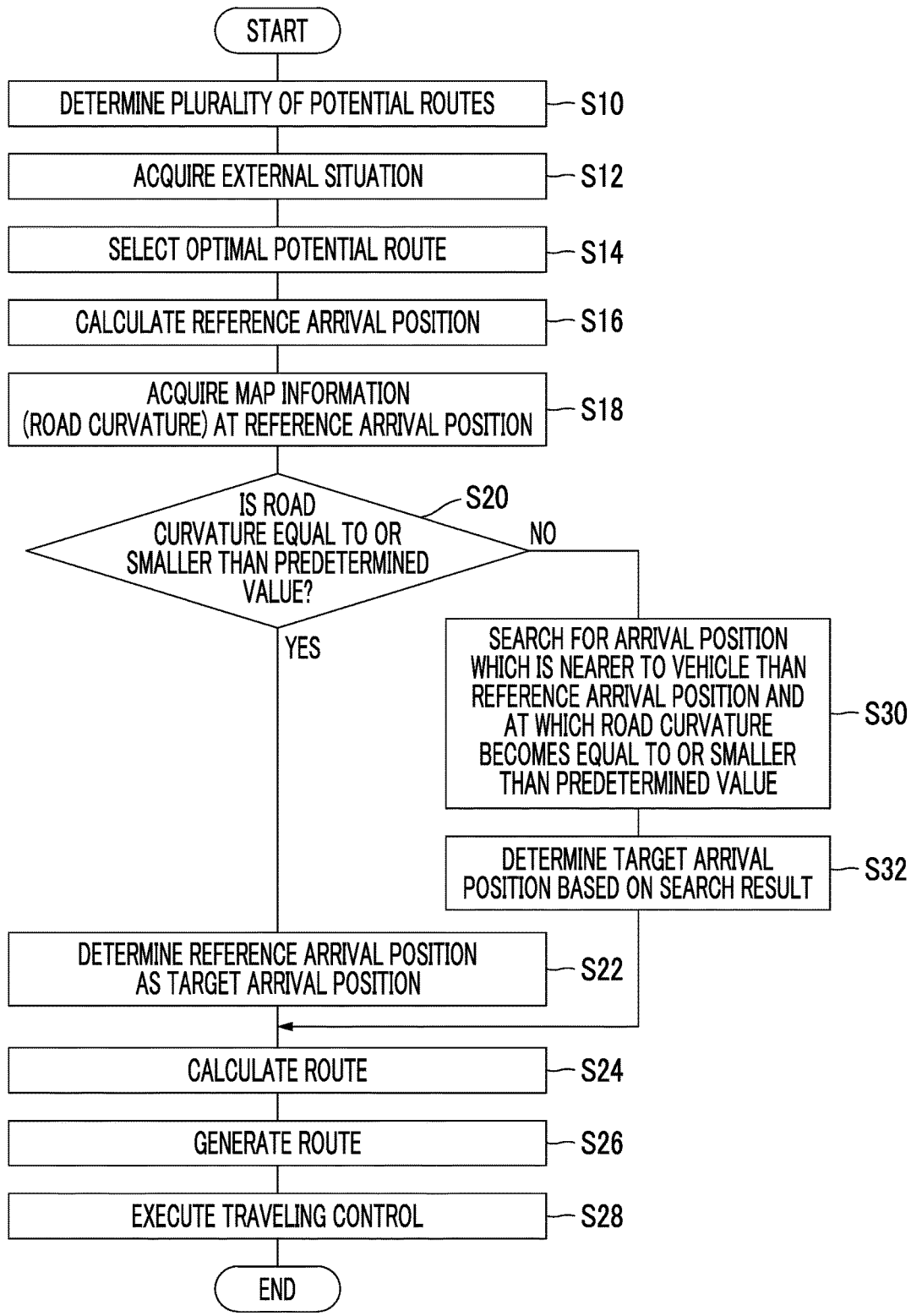
FIG. 9 is a flowchart showing an example of the vehicle control processing according to the first embodiment.

Next, the vehicle control processing performed by the vehicle control device 1 will be described. FIG. 9 is a flowchart showing an example of the vehicle control processing according to the first embodiment. The execution of the vehicle control processing shown in FIG. 9 is started, for example, when the autonomous driving ON/OFF switch is operated to request for starting autonomous driving. It is assumed that the vehicle position recognition unit 11 recognizes the position of the vehicle 2 at all times.

As shown in FIG. 9, the potential route determination unit 141 of the travel plan generation unit 14 first executes the potential route determination processing (S10) to determine a plurality of potential routes, based on the map information according to which the vehicle 2 is scheduled to travel. For example, along the lane 302, the travel plan generation unit 14 generates five potential routes, 314, 316, 318, 320, and 322, within the lane 302 in which the vehicle 2 travels, based on the positions of the lane boundaries 310 and 312 (see FIG. 4). After the execution of the determination processing (S10), the external situation acquisition processing (S12) is executed.

The external situation recognition unit 12 executes the external situation acquisition processing (S12) to recognize the external situation of the vehicle 2 based on the detection result of the external sensor 3. The acquisition processing (S12) may be executed not only at the time shown in FIG. 9 but also at any time. After the execution of the acquisition processing (S12), the selection processing (S14) is executed.

The potential route determination unit 141 executes the selection processing (S14) to select the optimal potential route from the plurality of potential routes determined by the potential route determination processing (S10). For example, the potential route determination unit 141 determines one potential route 316 from the five potential routes, 314, 316, 318, 320, and 322, according to the external situation (see FIG. 4). When only one potential route is determined by the determination processing (S10), the acquisition processing (S12) and the selection processing (S14) need not be executed. After the execution of the selection processing (S14), the reference arrival position calculation processing (S16) is executed.

The position calculation unit 142 of the travel plan generation unit 14 executes the reference arrival position calculation processing (S16) to calculate the reference arrival position based on the target time (or the target distance), the vehicle position, and the traveling state (see the position 20 in FIG. 5 and the position 20A in FIG. 6). After the execution of the calculation processing (S16), the map information acquisition processing (S18) is executed.

The arrival position determination unit 143 of the travel plan generation unit 14 executes the map information acquisition processing (S18) to acquire the road curvature at the reference arrival position by referring to the map database 6. After the execution of the acquisition processing (S18), the curvature determination processing (S20) is executed.

The arrival position determination unit 143 executes the curvature determination processing (S20) to determine whether the road curvature, acquired by the acquisition processing (S18), is equal to or smaller than the predetermined value. If the road curvature at the reference arrival position is equal to or smaller than the predetermined value, the arrival position determination unit 143 executes the target arrival position determination processing (S22) to determine the reference arrival position (position 20) as the target arrival position (see FIG. 5). After the execution of the determination processing (S22), the route calculation processing (S24) is executed.

The route calculation unit 144 of the travel plan generation unit 14 executes the route calculation processing (S24) to calculate the transition route from the vehicle position to the target arrival position. For example, the route calculation unit 144 calculates the transition route SR from the vehicle position C(1) to the target arrival position T(n+L) (see FIGS. 3A to 3C). After the execution of the route calculation processing (S24), the route generation processing (S26) is executed.

The route generation unit 145 of the travel plan generation unit 14 executes the route generation processing (S26) to generate the target route by connecting the transition route and the potential route that follows the arrival position. For example, the route generation unit 145 generates the target route 30 by connecting the route, from the position of the vehicle 2 to the position 20 that is the target arrival position, and the route that follows the position 20 on the potential route 314 (See FIG. 5). After the execution of the route generation processing (S26), the vehicle control processing (S28) is executed.

The travel control unit 15 executes the vehicle control processing (S28) to output the control signal to the actuator 8 based on the target route generated by the route generation processing (S26). This causes the vehicle 2 to travel along the target route. After the execution of the vehicle control processing (S28), the sequence of steps of the vehicle control processing is terminated. After that, it is determined whether the autonomous driving ending condition is satisfied. If the autonomous driving ending condition is not satisfied, the flowchart shown in FIG. 9 is executed again.

On the other hand, if the road curvature at the reference arrival position (position 20A) is larger than the predetermined value in the curvature determination processing (S20), the arrival position determination unit 143 executes the search processing (S30). The arrival position determination unit 143 searches for an arrival position which is nearer to the vehicle 2 than the reference arrival position and at which the road curvature becomes equal to or smaller than the predetermined value (see FIG. 8). The arrival position determination unit 143 executes the target arrival position determination processing (S32) to determine, as the target arrival position, a position (position 20B), where the vehicle 2 will arrive on the potential route in a time shorter than the target time or over a distance shorter than the target distance, based on the search result generated by the search processing (S30) (see FIG. 8). After the execution of the determination processing (S32), the route calculation processing (S24) is executed. The processing following the route calculation processing (S24) is as described above.

As described above, the vehicle control device 1 in the first embodiment executes the processing as follows. When transiting to a potential route that has been generated based on the map information, the vehicle control device 1 calculates the reference arrival position. The reference arrival position is the position where vehicle 2 arrives on the potential route using the target time (or target distance) that is set assuming that the road is a straight road. After that, the vehicle control device 1 determines, as the target arrival position, a position where the vehicle 2 will arrive on the potential route in a time shorter than the target time (or over a distance shorter than the target distance) according to the road curvature (an example of the map information) at the reference arrival position. In this way, this vehicle control device 1 can set the target arrival position at a position that is nearer to the vehicle 2 than the reference arrival position according to the road curvature. When the vehicle 2 travels along a curve, setting the target arrival position in this way allows the vehicle control device 1 to generate a shorter transition route to the potential route that has been generated based on the map information. Since the transition route is calculated and generated by calculation, shortening the transition route contributes to reducing the calculation load. In addition, since the calculation includes uncertainties, shortening the transition route contributes to reducing a decrease in the reliability of the target route. In addition, a shorter transition route allows the vehicle control device 1 to generate a target route along a curve. In other words, the vehicle control device 1 can generate a transition route that causes the vehicle 2 to arrive on the potential route at a position near to the straight road.

Furthermore, the vehicle control device 1 in the first embodiment uses a part of the previous target route as the first half of the transition route (fixed route for the first half), making it possible to reduce a decrease in the followability of the vehicle steering control.

Second Embodiment

A vehicle control device according to a second embodiment differs from the vehicle control device 1 according to the first embodiment in that the information used for determining whether the reference arrival position is used as the target arrival position is different. The other part of the second embodiment is the same as that of the first embodiment. Therefore, the description of the configuration and the operation similar to those of the vehicle control device 1 will not be repeated.

The arrival position determination unit of the vehicle control device according to the second embodiment determines, as the target arrival position, a position where the vehicle 2 will arrive on the potential route in a time shorter than the target time or over a distance shorter than the target distance, according to the external situation at the reference arrival position. That is, the target arrival position is determined using, not the map information (road curvature) of the reference arrival position, but the external situation. This is because the reliability of the target route is ensured by shortening the length of the transition route as the external situation becomes more complicated. The target time or the target distance in this embodiment is an arbitrary time or distance that is set in advance.

A specific example of the external situation is the number of other vehicles around the reference arrival position. Since it is necessary to consider avoiding contact with other vehicles around the vehicle 2 when calculating the target route, the transition route calculation load increases as the number of other vehicles in the surroundings increases. In addition, since the movement of other vehicles is uncertain, the reliability of the transition route also decreases as the number of other vehicles in the surrounding area increases.

Therefore, if the number of other vehicles around the reference arrival position is equal to or smaller than the predetermined number of vehicles, the arrival position determination unit determines the reference arrival position as the target arrival position. On the other hand, if the number of other vehicles around the reference arrival position is larger than the predetermined number of vehicles, the external situation is complicated. Therefore, in this case, the arrival position determination unit determines, as the target arrival position, a position where the vehicle 2 will arrive on the potential route in a time shorter than the target time or over a distance shorter than the target distance. The other configurations and operations are the same as those of the vehicle control device 1.

Figure 10:
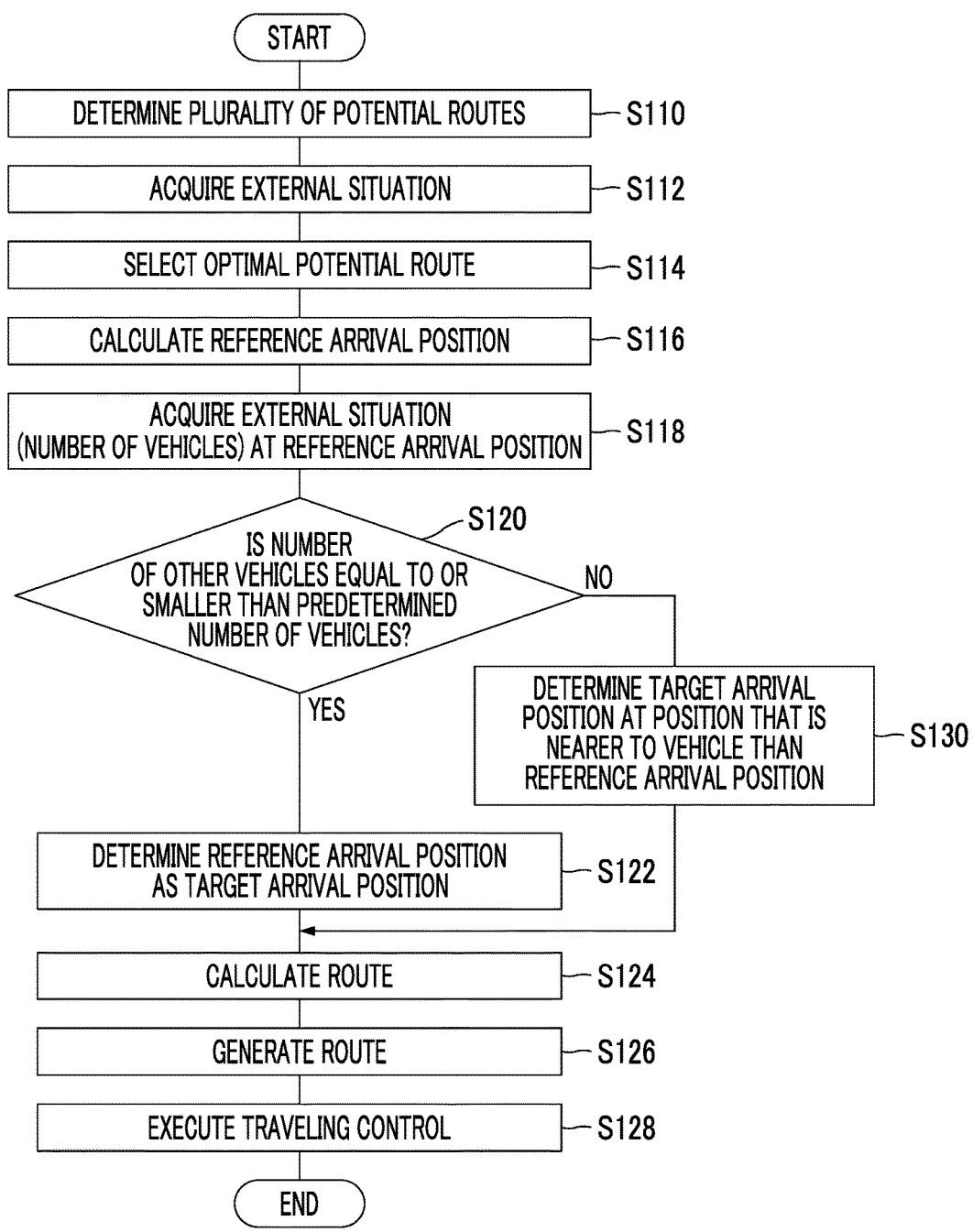
FIG. 10 is a flowchart showing an example of the vehicle control processing according to a second embodiment.

Next, the vehicle control processing performed by the vehicle control device will be described. FIG. 10 is a flowchart showing an example of the vehicle control processing according to the second embodiment. The execution of the vehicle control processing shown in FIG. 10 is started, for example, when the autonomous driving ON/OFF switch is operated to request for starting autonomous driving. It is assumed that the vehicle position recognition unit recognizes the position of the vehicle 2 at all times.

The potential route determination processing (S110), the external situation acquisition processing (S112), the selection processing (S114), and the reference arrival position calculation processing (S116) shown in FIG. 10 are the same respectively as the potential route determination processing (S10), the external situation acquisition processing (S12), the selection processing (S14), and the reference arrival position calculation processing (S16) shown in FIG. 9.

The arrival position determination unit of the travel plan generation unit executes the external situation acquisition processing (S118) to acquire the number of other vehicles around the reference arrival position by referring to the information acquired from the external sensor 3. After the execution of the acquisition processing (S118), the number of vehicles determination processing (S120) is executed.

The arrival position determination unit executes the number of vehicles determination processing (S120) to determine whether the number of other vehicles, acquired by the acquisition processing (S118), is equal to or smaller than the predetermined number of vehicles. If the number of other vehicles is equal to or smaller than the predetermined number of vehicles, the arrival position determination unit executes the target arrival position determination processing (S122) to determine the reference arrival position as the target arrival position. After the execution of the determination processing (S122), the route calculation processing (S124) is executed.

On the other hand, if it is determined by the number of vehicles determination processing (S120) that the number of other vehicles, acquired by the acquisition processing (S118), is larger than the predetermined number of vehicles, the arrival position determination unit executes the determination processing (S130). The arrival position determination unit executes the determination processing (S130) to determine, as the target arrival position, a position that is nearer to the vehicle 2 than the reference arrival position. After the execution of the determination processing (S130), the route calculation processing (S124) is executed.

The route calculation processing (S124), the route generation processing (S126), and the vehicle control processing (S128) are the same respectively as the route calculation processing (S24), the route generation processing (S26), and the vehicle control processing (S28) shown in FIG. 9.

As described above, if the number of other vehicles is small, the vehicle control device in the second embodiment can cause the vehicle to arrive on the potential route at the reference arrival position. On the other hand, if the number of other vehicles is large, the vehicle control device can cause the vehicle to arrive on the potential route at a position that is nearer to the vehicle than the reference arrival position. In this way, if the number of other vehicles in the surroundings is large, in other words, if the external situation is complicated, this vehicle control device can generate a shorter transition route so that the vehicle can arrive on the potential route, which has been generated based on the map information, as quickly as possible.

Third Embodiment

A vehicle control device according to a third embodiment differs from the vehicle control device 1 according to the first embodiment in that the information used for determining whether the reference arrival position is used as the target arrival position is different. The other part of the third embodiment is the same as that of the first embodiment. Therefore, the description of the configuration and the operation similar to those of the vehicle control device 1 will not be repeated.

The arrival position determination unit of the vehicle control device according to the third embodiment determines, as the target arrival position, a position where the vehicle 2 will arrive on the potential route in a time shorter than the target time or over a distance shorter than the target distance, according to the map information (road type). That is, the target arrival position is determined using, not the road curvature at the reference arrival position, but the road type. The road type, which is stored in the map database 6, is information for identifying the type such as a freeway or a road other than a freeway (an open road). The freeway is, for example, a road for the exclusive use of vehicles without intersection, on which there is no traffic of pedestrians or bicycles. The number of branches, mergers, or increases/decreases in the number of lanes of a freeway is smaller than that of an open road. On the other hand, the number of signals, branches and mergers of an open road is larger than that of a freeway. For this reason, the environment is more complex for an open road than for a freeway. In this way, the road type serves as an index for determining whether the external situation is complicated or not. As described above, it is better to shorten the length of a transition route as the external situation becomes more complicated. The target time or the target distance in this embodiment is an arbitrary time or distance that is set in advance.

If the road on which the vehicle is traveling is a freeway, the arrival position determination unit determines the reference arrival position as the target arrival position. On the other hand, if the road on which the vehicle is traveling is an open road, the external situation is complicated. Therefore, in this case, the arrival position determination unit determines, as the target arrival position, a position where the vehicle will arrive on the potential route in a time shorter than the target time or over a distance shorter than the target distance. The other configurations and operations are the same as those of the vehicle control device 1.

Figure 11:
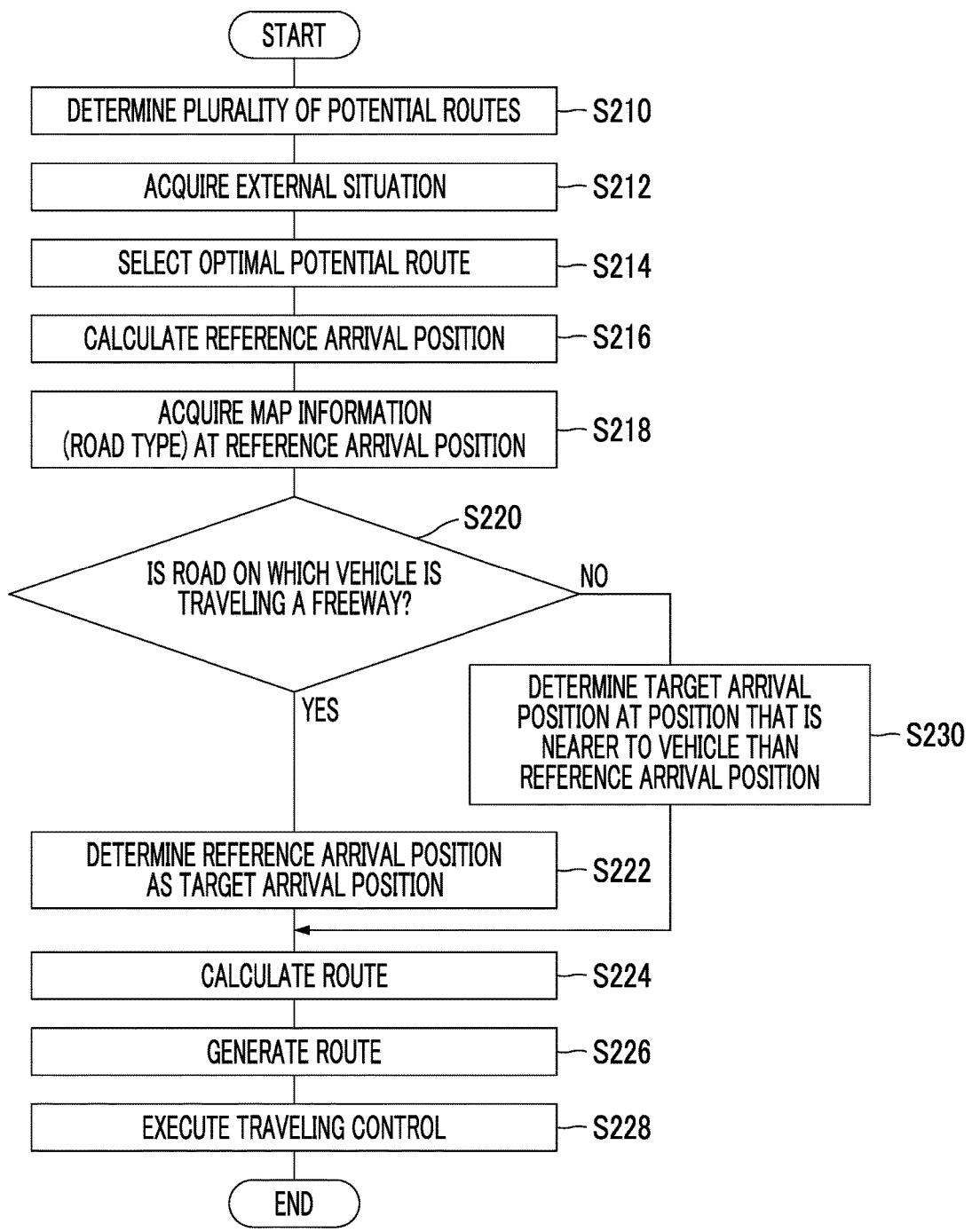
FIG. 11 is a flowchart showing an example of the vehicle control processing according to a third embodiment.

Next, the vehicle control processing performed by the vehicle control device will be described. FIG. 11 is a flowchart showing an example of the vehicle control processing according to the third embodiment. The execution of the vehicle control processing shown in FIG. 11 is started, for example, when the autonomous driving ON/OFF switch is operated to request for starting autonomous driving. It is assumed that the vehicle position recognition unit recognizes the position of the vehicle 2 at all times.

The potential route determination processing (S210), the external situation acquisition processing (S212), the selection processing (S214), and the reference arrival position calculation processing (S216) shown in FIG. 11 are the same respectively as the potential route determination processing (S10), the external situation acquisition processing (S12), the selection processing (S14), and the reference arrival position calculation processing (S16) shown in FIG. 9.

The arrival position determination unit of the travel plan generation unit executes the map information acquisition processing (S218) to acquire the road type at the reference arrival position by referring to the map database 6. After the execution of the acquisition processing (S218), the type determination processing (S220) is executed.

The arrival position determination unit executes the type determination processing (S220) to determine whether the road on which the vehicle is traveling is a freeway, based on the road type acquired by the acquisition processing (S218). If the road on which the vehicle is traveling is a freeway, the arrival position determination unit executes the target arrival position determination processing (S222) to determine the reference arrival position as the target arrival position. After the execution of the determination processing (S222), the route calculation processing (S224) is executed.

On the other hand, if it is determined by the type determination processing (S220) that the road on which the vehicle is traveling is not a freeway, the arrival position determination unit executes the determination processing (S230). The arrival position determination unit executes the determination processing (S230) to determine, as the target arrival position, a position that is nearer to the vehicle 2 than the reference arrival position. After the execution of the determination processing (S230), the route calculation processing (S224) is executed.

The route calculation processing (S224), the route generation processing (S226), and the vehicle control processing (S228) are the same respectively as the route calculation processing (S24), the route generation processing (S26), and the vehicle control processing (S28) shown in FIG. 9.

As described above, if the vehicle is traveling on a freeway, the vehicle control device in the third embodiment can cause the vehicle to arrive on the potential route at the reference arrival position. On the other hand, if the vehicle is traveling on an open road, the vehicle control device can cause the vehicle to arrive on the potential route at a position that is nearer to the vehicle than the reference arrival position. In this way, if the vehicle is traveling on an open road, in other words, if the external situation is complicated, this vehicle control device can generate a shorter transition route so that the vehicle can arrive on the potential route, which has been generated based on the map information, as quickly as possible.

The above-described embodiments can be implemented in various forms in which various changes and improvements are made based on the knowledge of those skilled in the art. For example, in the embodiments, the arrival position determination unit of the vehicle control device may determine, as the target arrival position, a position where the vehicle 2 will arrive on the potential route in a time longer than the target time or over a distance longer than the target distance, depending on the map information or the external situation. That is, if it is determined that there is no need to shorten the transition route, the arrival position determination unit may be configured to determine, as the target arrival position, a position at which the vehicle 2 will arrive on the potential route over a long distance. In this case, too, as in the above-described embodiments, the vehicle control device can cause the vehicle 2 to travel according to the map information or the external situation.

What is claimed is:
1. A vehicle control device comprising:
a map database that stores map information; and
at least one electronic control unit configured to
recognize a map position, the map position being a position of a vehicle on a map,
recognize an external situation of the vehicle and a road position, the road position being a position of the vehicle on a road,
recognize a traveling state of the vehicle,
generate a target route based on the map information, the map position, the external situation, and the traveling state,
cause the vehicle to travel based on the target route,
determine a potential route based on the map information,
calculate a reference arrival position based on a target time or a target distance, the road position, and the traveling state, the target time being a predetermined time required for the vehicle to arrive on the potential route, the target distance being a distance required for the vehicle to arrive on the potential route from the road position, the reference arrival position being a position where the vehicle arrives on the potential route from the road position using the target time or the target distance, determine, according to the map information or the external situation at the reference arrival position, as a target arrival position, a position where the vehicle arrives on the potential route in a time different from the target time or over a distance different from the target distance, calculate a transition route from the road position to the target arrival position, and generate the target route by connecting the transition route and the potential route following the target arrival position.

2. The vehicle control device according to claim 1, wherein the at least one electronic control unit is configured to, according to the map information or the external situation at the reference arrival position, determine, as the target arrival position, a position where the vehicle arrives on the potential route in a time shorter than the target time or over a distance shorter than the target distance.

3. The vehicle control device according to claim 2, wherein the transition route includes a first half, the first half being from the road position to a predetermined point on a target route generated last time, and a second half, the second half being from the predetermined point to the target arrival position, and the at least one electronic control unit is configured to generate the target route at a predetermined periodic interval and to calculate the second half.

4. The vehicle control device according to claim 2, wherein the at least one electronic control unit is configured to determine the reference arrival position as the target arrival position when a road curvature of the reference arrival position is equal to or smaller than a predetermined value, and determine, as the target arrival position, the position where the vehicle arrives on the potential route in the time shorter than the target time or over the distance shorter than the target distance when the road curvature of the reference arrival position is larger than the predetermined value.

5. The vehicle control device according to claim 4, wherein the at least one electronic control unit is configured to determine, as the target arrival position, a position on the potential route, at which road curvature is equal to or smaller than the predetermined value.

6. The vehicle control device according to claim 2, wherein the at least one electronic control unit is configured to determine the reference arrival position as the target arrival position when the number of other vehicles around the reference arrival position is equal to or smaller than a predetermined number of vehicles, and determine, as the target arrival position, the position where the vehicle arrives on the potential route in the time shorter than the target time or over the distance shorter than the target distance, when the number of other vehicles around the reference arrival position is larger than the predetermined number of vehicles.

7. The vehicle control device according to claim 2, wherein the at least one electronic control unit is configured to determine the reference arrival position as the target arrival position when a road on which the vehicle is traveling is a freeway, and determine, as the target arrival position, the position where the vehicle arrives on the potential route in the time shorter than the target time or over the distance shorter than the target distance when the road on which the vehicle is traveling is an open road.

8. The vehicle control device according to claim 1, wherein the at least one electronic control unit is configured to generate a plurality of routes based on the map information, and determine the potential route by selecting, according to the external situation, one route among the plurality of routes.

9. The vehicle control device according to claim 4, wherein the map information includes a road curvature at a predetermined point on the potential route.

10. The vehicle control device according to claim 1, further comprising:

an actuator, wherein the at least one electronic control unit is configured to cause the vehicle to travel autonomously using the actuator.

* * * * *